United States Patent Office 2,837,931
Patented June 10, 1958

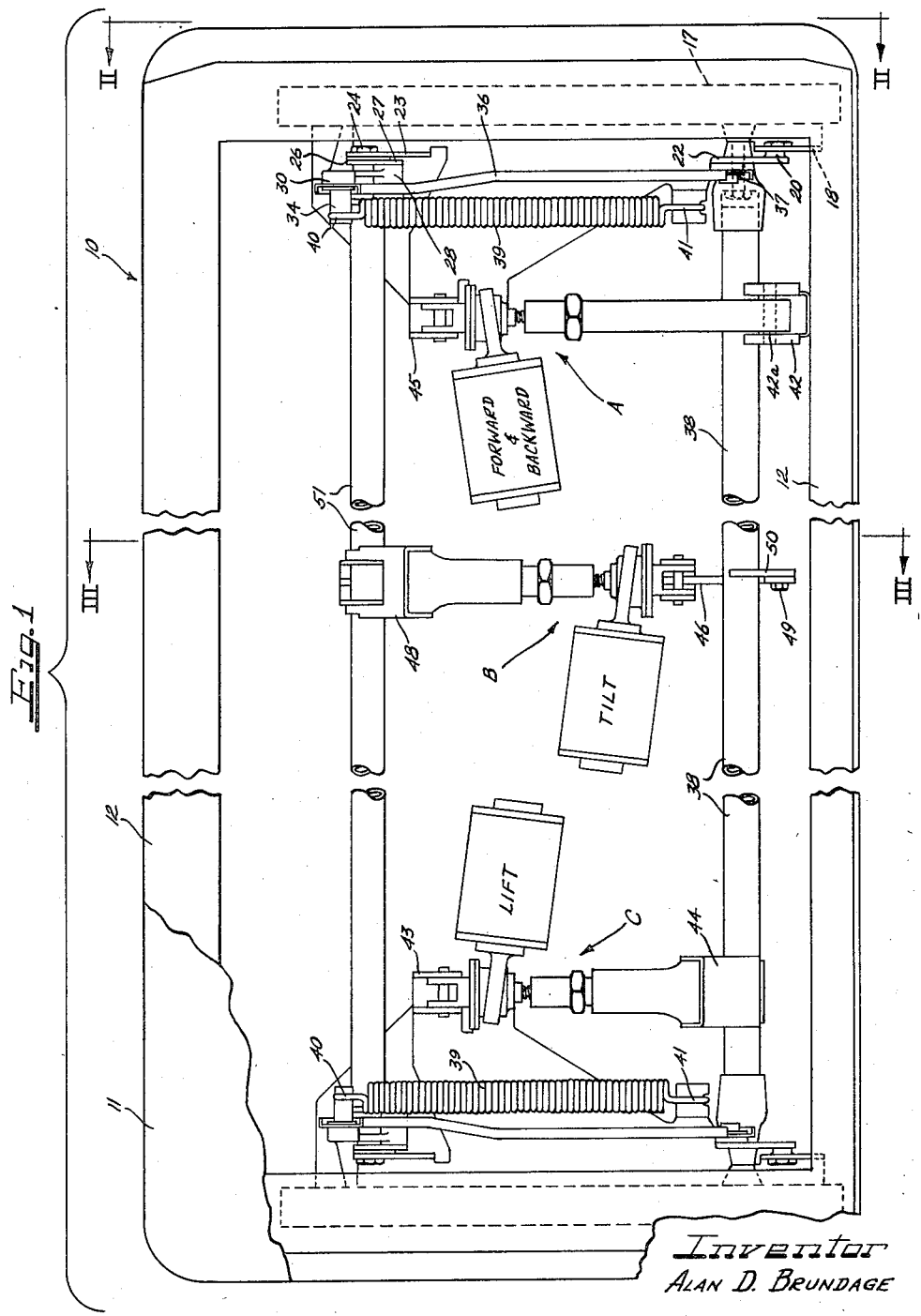

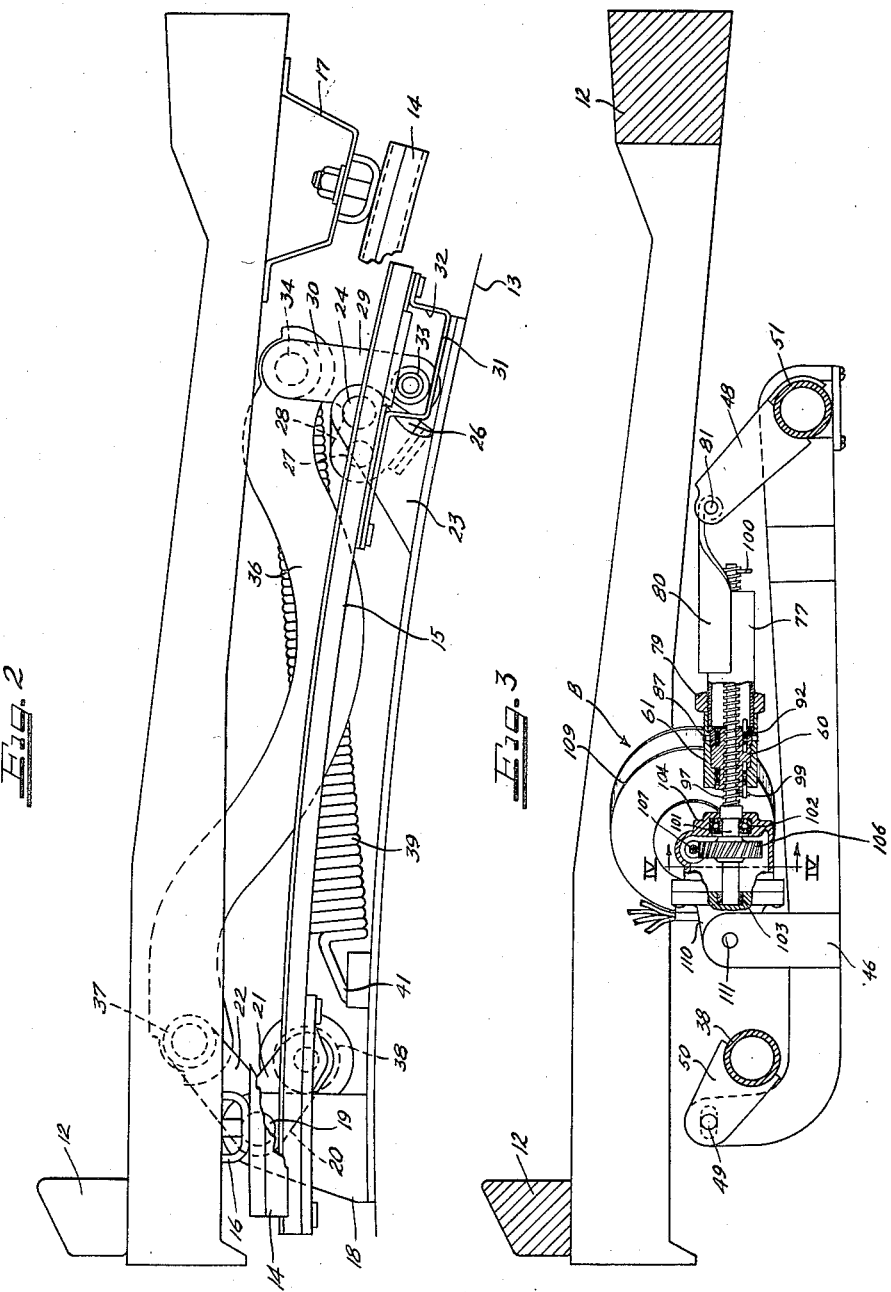

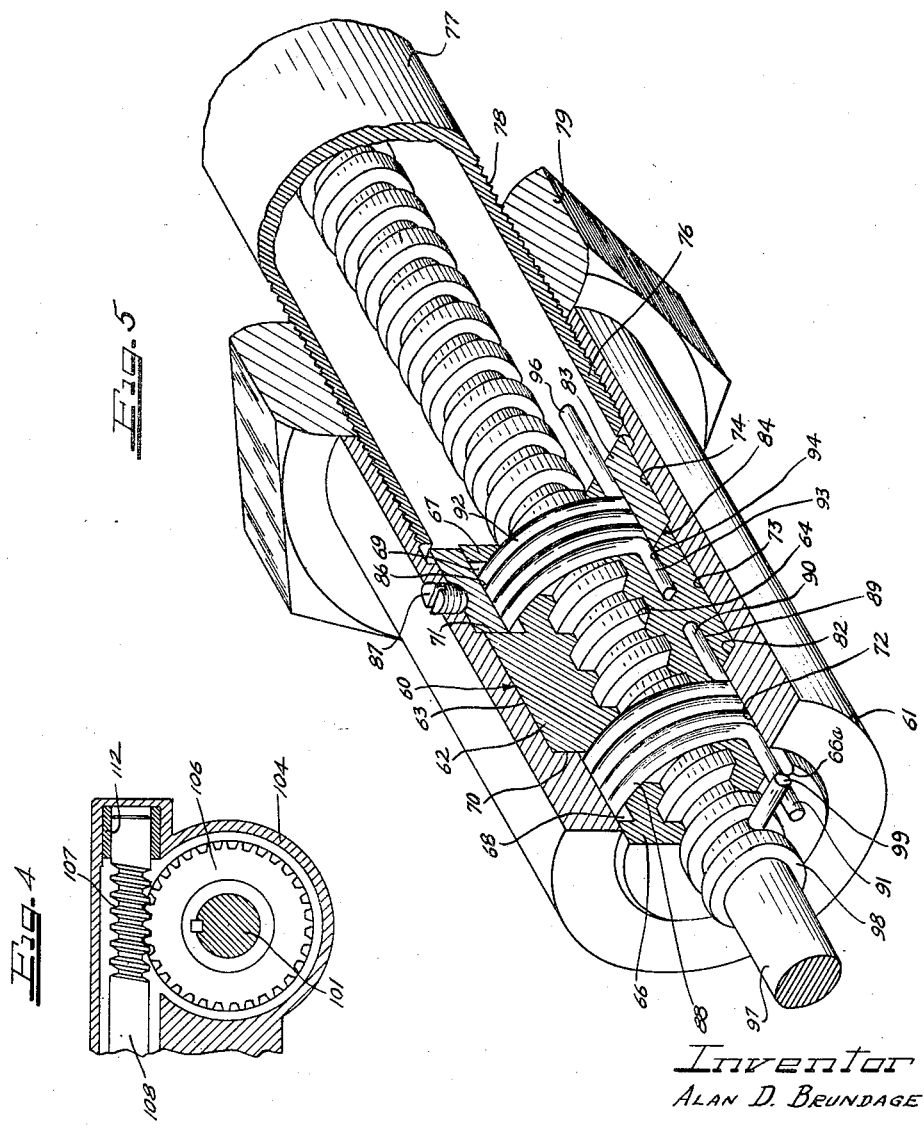

2,837,931

NON-JAMMING SCREW AND NUT ASSEMBLY FOR ACTUATOR

Alan D. Brundage, Birmingham, Mich., assignor to Houdaille Industries, Inc., Detroit, Mich., a corporation of Michigan Application April 11, 1956, Serial No. 577,463

5 Claims. (Cl. 74—424.8)

This invention relates generally to a mechanical movement and more particularly to a screw-type actuator having a self-locking spring clutch capable of effecting a load release or "free wheeling" at selected positions of adjustment. There is thus combined the axial motion of a nut and screw assembly with a free wheeling load release means at predetermined limits of travel.

It is an object of the present invention to provide an improved mechanical movement.

Another object of the present invention is to provide an improved screw-type actuator.

Yet another object of the present invention is to combine in a screw-type actuator a spring-type clutch capable of effecting a free wheeling at selected positions corresponding to predetermined limits of travel.

A further object of the present invention is to provide an improved actuator for seat adjusters or top lifters or other automotive accessories.

Many other features, advantages and additional objects of the present invention will become manifest to those versed in the art upon making reference to the detailed description which follows and the accompanying sheets of drawings in which a preferred structural embodiment of a screw-type actuator incorporating the principles of the present invention is illustrated by way of example.

On the drawings:

Figure 1 is a top plan view, fragmentary in part, and with parts broken away, showing a seat adjusting mechanism embodying a plurality of screw-type actuator units constructed in accordance with the principles of the present invention;

Figure 2 is an end view taken generally on line II—II of Figure 1 and illustrates additional details of construction of the seat adjuster mechanism of Figure 1;

Figure 3 is a fragmentary cross-sectional view taken generally on line III—III of Figure 1 and illustrates additional details of construction of one of the screw-type actuators incorporated in the seat adjuster mechanism, parts being broken away and parts being shown in cross-section to illustrate details of construction of the screw-type actuator;

Figure 4 is a fragmentary enlarged cross-sectional view taken generally on line IV—IV of Figure 3; and Figure 5 is a fragmentary isometric view with parts broken away and with parts shown in cross-section illustrating the structural details of the screw-type actuator of the present invention.

As shown on the drawings:

The screw-type actuator of the present invention comprises a mechanical movement of general utility, however, in order to best illustrate the construction and use of the actuator, a representative application of the actuator is referred to for the purposes of this disclosure, namely, a seat adjuster mechanism for an automotive vehicle as shown generally in Figure 1 by the reference numeral 10. A seat cushion 11 is carried by a generally rectangular frame 12 and is adapted to be adjustably carried on a relatively stationary support 13 which may conveniently comprise a body portion of an automobile. Accordingly, at opposite ends of the frame 12, there is provided slide track means 14 secured to the underside of the frame 12 by means of a front bracket 16 and a rear bracket 17. Although not all of the structural elements of the slide track mechanism are necessary to a proper understanding of the principles of the present invention, those versed in the art will appreciate that components of the slide track means 14 can be carried by the support 13 through bracket means which are indicated herein generally by the reference numeral 15 (Figure 2). One of the actuator units of the present invention indicated generally by the reference A (Figure 1) is provided to selectively move the seat frame 12 forwardly and backwardly between end limit positions of forward and backward adjustment.

For further effecting either a platform lift of the seat frame 12 or to effect selective tilting of the seat frame 12, a linkage assembly is provided for accommodating vertical movements of the frame 12 as well as forward and backward movements permitted by the slide track 14. Thus there is provided a bracket 18 at the front of the seat adjuster mechanism 10 having a pivot 19 carrying a bell crank 20 including a first arm 21 and a second arm 22.

At the rear of the mechanism, there is provided a bracket 23 which is fastened to the support 13 having a pivot mounting 24 pivotally supporting a pivot bracket 26 which, in turn, provides a pivot mounting 27 to which is connected in pivotal assembly one arm 28 of a bell crank 29, the second arm of the bell crank 29 being indicated at 30. A guide bracket 31 fastened to the bracket means 17 provides an elongated slot or guideway 32 in which is received a roller 33 supported by the bell crank 29.

A pivotal connection indicated at 34 (Figure 2) connects the arm 30 of the bell crank 29 to a bar member 36 extending towards the forward end of the seat adjuster mechanism 10 and pivotally connected at its other end to the arm member 22 of the bell crank 20 as indicated at 37.

The arm 21 of the bell crank 20 carries a cross rod 38 which is also shown in Figure 3, the cross rod 38 being connected at opposite ends to the bracket means 17.

A coil spring 39 is connected to the crank arm 30 of the bell crank 29 as at 40 and is connected as at 41 to the support 13.

As shown in Figure 1, a screw actuator unit B is provided for effecting a tilting operation of the mechanism 10 and an actuator unit indicated at C is provided for effecting a selective platform lift adjustment of the mechanism 10.

Referring briefly to the operational characteristics of the three units A, B and C, it will be noted that the unit A has relatively extensible members, one of the members being pivotally connected to a support bracket 35 carried by the support structure 13. The other extensible member is connected to the seat frame 12 by means of a bracket 42 having a pin 42a extending therethrough. Thus, upon relative extension or contraction of the extensible elements, movement is produced between the support structure 13 and the frame 12.

The unit C is connected to a bracket 43 carried by the support structure 13 at one end and includes a bracket 44 connected to the cross bar 38 at the other end. Thus, upon relative extension or contractual adjustment of the extensible members of the unit C, the cross bar 38 is moved within a confined path determined by the bell crank 20 since the cross bar 38 is supported by the crank arms 21 of the supporting structures at opposite sides of the seat mechanism 10.

Moreover, when the bell crank 20 is actuated, the crank arm 22 will transmit relative movement through the bar member 36 to the crank arm 30 of the bell crank 29, whereupon the entire bell crank 29 will pivot around the pivot mounting 27 and both ends of the seat frame 12 will be elevated in unison to afford a platform lift adjustment.

The tilting unit B is pivotally supported by a bracket member 46 at one end and is pivotally connected to a second bracket indicated at 48. The bracket 46 has a pivotal connection as at 49 with a lever arm 50 connected to the cross rod 38. The bracket 48 is connected to a second cross rod indicated at 51 which is connected at opposite ends to corresponding pivot frame members previously indicated at 26. Thus, whenever relative extension occurs through actuation of the tilting unit B, the cross rod 51 will operate to pivot the pivot bracket 26 about the axis of the pivot mounting 24, which incidentally, is coincident with the axis of the cross rod 51 thereby swinging the pivot mounting 27 and producing a corresponding movement of the bell crank 29 and specifically the roller 33. During this tilting operation, the pivot mounting 34 is restrained since the bar member 36 is connected thereto and is in turn connected to the bell crank member 20. The tilting unit is carried by the bracket means 46, however, and since the bracket means 46 is connected to the cross rod 38, no pivotal movement of the bell crank 20 occurs thereby insuring a tilting movement of the bell crank 29 about the axis 24 and a consequent tilting of the seat frame 12.

Although three separate actuator units are illustrated in connection with the seat adjuster mechanism 10, it will be appreciated that each of the units A, B and C can be constructed along substantially similar lines. Accordingly, only one of the units will be described in detail in connection with the disclosure of the structural and functional features of the screw-type actuator of the present invention.

Each of the units such as the unit B illustrated in Figure 3 includes inner and outer parts provided by a nut member 60 and a thrust or retainer member 61, respectively.

The trust or retainer member 61 is adapted to be connected to a means to be actuated, for example, as disclosed herein to the appropriate frame members of the seat adjuster mechanism 10.

Referring first to the nut member 60, it will be noted that the nut member comprises a generally cylindrical body portion 62 having an outer peripheral surface 63 and is particularly characterized by the provision therein of an open-ended helically screw-threaded bore identified at 64.

At opposite ends of the body portion 62, there is provided reduced tubular extensions, one extension being indicated at 66 and the second extension being indicated at 67. Each of the extensions 66 and 67 is particularly characterized by the provision in the peripheral surface thereof an annular recess 68 and 69, respectively. A radially extending shoulder 70 is thus provided between the body portion 62 and the extension 66 and a radially extending shoulder 71 is formed between the extension 67 and the body portion 62.

The thrust or retainer member 61 comprises a generally cylindrical tubular element having an open-ended bore 72 extending completely therethrough. The bore 72 is successively counterbored to provide a first counterbore 73 and a second counterbore 74. Adjacent the open end of the counterbore 74, the internal walls of the thrust or retainer member 61 are threaded as at 76. The threads 76 facilitate attachment of the thrust or retainer member 61 to a device to be actuated. In this embodiment, a tubular member 77 threaded as at 78 is engaged with the thrust or retainer member 61 and is locked by means of a nut 79. In connection with the unit B, the tubular member 77 is in turn firmly assembled to a bracket member 80 pivotally connected as at 81 to the lever arm 48.

Referring now further to Figure 5, it will be noted that the nut member 60 and the thrust or retainer member 61 are arranged as inner and outer parts with the extension 66 received within the bore 72 and the body portion 62 received within the first counterbore 73, the other extension 67 being received within the second counterbore 74. The shoulder 70 on the nut member 60 engages against an annular radially extending shoulder 82 formed between the bore 72 and the first counterbore 73.

An annular ring member indicated at 83 is received within the counterbore 74 and provides an end surface 84 abutting against the shoulder 71 on the nut member 60. The inside surface of the ring member, as indicated at 86, is preferably of the same diameter as the bore 72 and the ring member 83 is of a width sufficient to bridge the area concentrically outwardly of the annular recess 69 in the extension 67. The ring member 83 is locked in firm assembly with the thrust or retainer member 61 by one or more set screws 87 threaded through appropriately provided apertures formed in the peripheral walls of the thrust or retainer member 61 in register with the second counterbore 74.

Operatively interposed between the thrust or retainer member 61 and the nut member 62, are provided means for interconnecting the inner and outer parts and providing a limited frictional connection therebetween, the interconnecting means consisting of helically wound coils operatively fastened to the inner member and forced radially outwardly of the coiling axis thereof by the self-energizing action of the coil springs into gripping engagement with the outer part.

More specifically, it will be noted that a first coil spring 88 is received within the recess 68 and has its coiling axis coincident with the axis of the nut member 60. The body portion 62 is recessed as at 89 and one end of the coil spring 88 is received therein as at 90.

Peripheral surface portions of the coils on the spring 88 form an engagement surface which confronts and engages against the wall surface provided by the bore 72 in the thrust or retainer member 61. It will be understood that the recess 68 is shallow enough so that the coils of the spring 88 extend radially outwardly of the tubular extension 66 for engagement with the bore walls of the bore 72.

The other end of the coil spring 88, as indicated at 91, is angularly offset and projects axially outwardly of the extension 66 of the nut member 60 through a recessed arcuate slot 66a coaxial with the axis of the shaft 97, thereby confining the end 91 for limited movement.

A second coil spring 92 is received within the recess 69 and one end of the spring 92 indicated at 93 is received within a recess 94 formed in the body portion 62 of the nut member 60. The peripheral surface of the coils of the spring 92 projects radially outwardly of the recess 69 and confronts and engages against the adjoining inside surface 86 of the ring member 83 firmly assembled to the thrust or retainer member 61. It will be understood that the self-energizing action of the coil springs 88 and 92 tending to unwind the coils of the springs produces a radial coupling force for locking the nut member 60 to the thrust or retainer member 61.

The other end of the coil spring 92 is indicated at 96 and is preferably angularly offset and projects axially beyond the end of the extension 67 of the nut member 60 through a recessed arcuate slot coaxial with the axis of the shaft 97, thereby confining the end 96 for limited movement.

A third member is provided in accordance with the principles of the present invention and constitutes a screw shaft 97 having helical screw threads 98 formed on the peripheral surface thereof. The screw shaft 97 is threaded through the nut member 60 and upon relative rotation between the screw shaft 97 and the nut member 60, relative axial movement will occur.

At one end of the screw shaft 97, there is provided a stop pin 99 and at the other end of the screw shaft 97, there is provided a stop pin 100 (Figure 3). The stop pins 99 and 100 are axially spaced apart from one another at limit positions corresponding to the desired limits of adjustment required for the specific actuator. As the nut 60 reaches a stop pin 99 or 100, the projecting end 91 or 96 of a corresponding coil spring 88 or 92 will engage the pin whereupon the spring will wind up and the radial force between the spring (in effect, the nut 60 because of the connection of the other end of the spring to the nut) and the thrust or retainer member 61 will be decreased. When the radial coupling force is decreased, the nut 60 will rotate within the thrust or retainer member 61 at the same velocity as the spring shaft 97, thereby producing a "free wheeling" or load-releasing action which will prevent damage to the equipment if the screw shaft continues to rotate after the limits of travel have been attained. When one spring is wound up, the other spring will still be exerting a coupling force between the nut and the thrust member, but in insufficient amount to retain the nut and thrust member together.

As shown in Figure 3, the screw shaft 97 has an extension 101 journaled in a pair of spaced bearings 102 and 103 carried in a gear box 104. A gear 106 is carried by the extension 101 and meshes with a worm 107 attached to the power take-off shaft 108 of an electric motor 109 mounted in firm assembly on the gear box 104. A suitable mounting bracket 110 is provided to carry the gear box 104 and the electric motor 109 in pivotal assembly, for example, on the bracket 46 in the case of the unit B, the pivot mounting being indicated at 111. As shown in Figure 4, the power take-off shaft 108 is provided with bearing support as at 112 on the free end thereof adjacent the worm 107.

In operation, upon rotation of the screw shaft 97, with no stop means in engagement with the coil spring means, the tendency of the nut 60 to rotate in the same direction as the screw shaft 97, due to the torque resulting from friction between the nut 60 and the screw shaft 97 is resisted by the self-energizing action of the coil spring means, which in unwinding in the confined space provided between the walls of the thrust or retainer member 61 and the recesses 68 and 69, expands and exerts a radial force against the thrust and retainer member 61, effectively preventing the nut 60 from rotating within the thrust and retainer member 61. The thrust and retainer member 61, then transmits the axial motion of the nut to a device to be translated.

Since the coil spring means are self-energizing in one direction only, the present invention contemplates the provision of two separate coiled springs 88 and 92 particularly since the actuator units are designed to provide adjustment of the nut and the elements associated therewith in opposite directions.

When the nut 60 reaches a stop pin 99 or 100 which is a limit of the axial motion, the projected ends 91 or 96 of the springs 88 and 92 engages a corresponding pin 99 or 100 whereupon the corresponding spring will wind-up, decreasing the radial force between the abutting surfaces whereupon the nut 60 will rotate within the retainer 61 at the same velocity as the screw shaft 97.

Although various minor modifications might be suggested by those versed in the art, it should be understood that I wish to embody within the scope of the patent warranted hereon all such modifications as reasonably and properly come within the scope of my contribution to the art.

I claim as my invention:

1. An actuator comprising, a screw shaft, means for rotatably driving said shaft in opposite directions, a nut member mounted on said shaft, coiled spring means having a coiling axis coinciding with the axis of said shaft and encircling the outer peripheral portion of said nut member, said spring means being locked at one operative end thereof to said nut member and at the opposite operative end comprising a spring stop means, a non-rotatable thrust member adapted to be connected to a means to be thrust-actuated having formed thereon a bearing surface engaging the peripheral surfaces of the coils of said spring means and acting with said spring means to normally retain said nut in non-rotatable relation to said shaft, and shaft stop means at spaced points on said shaft engaging with said spring stop means to wind up said coiled spring means to overcome the self-energizing action of the spring means, thereby decreasing the radial force between the nut member and the thrust member and affording rotation of the nut within the retainer at the same velocity as the threaded shaft.

2. A mechanical movement comprising, in combination, a rotatable screw shaft, a nut member threaded thereon, coil spring means on said nut member having a coiling axis parallel to the axis of said nut member and being self-energized in unwinding direction, said coil spring means being locked at one operative end to said nut, said shaft having axially spaced stop means cooperating with the other operative end of said coil spring means to wind up said spring means and thereby decrease the diametral size of the coils at the limits of axial travel of said nut member on said screw shaft, and a non-rotatable retainer thrust member adapted to be connected to a means to be actuated and having an axially extending bearing surface cooperating with the peripheral surfaces of said coils to normally hold said nut member against rotation during rotation of said shaft to provide relative axial movement of said nut member and said screw shaft but providing for rotation of said nut member with said shaft to limit movement of said nut member axially beyond predetermined positions on said screw shaft set by said stop means.

3. A mechanical actuator comprising, a non-rotatable thrust member adapted to be connected to a device to be actuated and having an open-ended bore extending therethrough, a first and second counterbore in said thrust member each providing corresponding first and second radially extending annular shoulders in said bore, a nut member having oppositely extending tubular extensions, one of said extensions received in said bore, said nut received in said first counterbore and abutting against said first shoulder, the other of said extensions received in said second counterbore, said extensions being peripherally recessed, a coil spring on each recessed extension having outer peripheral coil surfaces extending radially outwardly of said extensions for engagement with an adjoining surface, a ring member in said second counterbore between said thrust member and the corresponding coil spring and abutting against said second shoulder, locking means carried by said thrust member engaging said ring member, thereby retaining said ring member and said nut member within said thrust member, one end of each said coil spring being connected to said nut member, the self-energizing action of said coil spring providing a radial force for locking said nut to said thrust member, a rotatable screw shaft threaded through said nut member and cooperating therewith for threadedly advancing said thrust member, and axially spaced stop means on said screw shaft selectively engaging the other end of each said coil spring, thereby to wind up the corresponding spring and decrease the radial force between the thrust member and the nut member to effect corotation of the nut member with the shaft and to limit the axial movement of the nut and thrust member.

4. A mechanical actuator comprising inner and outer relatively rotatable members, a concentrically disposed coil spring between said inner and outer members connected to one of said members and exerting a radial coupling force between the members as a function of the self-energizing action of said coil spring for locking said inner and outer members against rotation, a rotatable third member, means forming a driving connection between one of said inner and outer members and said third member for axially moving said inner and outer members relative to said third member, and stop means on said third member cooperating with said coil spring operative to limit relative axial movement of said one of said inner and outer members and said third member beyond a predetermined axial position by winding up said coil spring to reduce said radial coupling force, thereby releasing said inner and outer members for relative rotation at said predetermined axial position.

5. A translation adjuster comprising, a motor having a gear box housing, means for pivotally securing said gear box housing and said motor on a stationary support, a screw shaft projecting out of said gear box housing and being rotatably driven in selected angular direction by said motor, a pair of axially spaced stop pins on said screw shaft, a nut member threaded on said screw shaft and movable between said stop pins upon relative rotation between said nut member and said screw shaft, frame means to be translatably adjusted including a non-rotatable thrust member circumjacent said nut member, coil spring means locking said nut member and said thrust member together non-rotatably but engaging and cooperating with said stop pins to render said coil spring means inactive, thereby permitting said nut member to rotate relative to said thrust member and together with said screw shaft at the limit positions.

References Cited in the file of this patent
UNITED STATES PATENTS

| | | |
|---|---|---|
| 2,132,009 | Ball | Oct. 4, 1938 |
| 2,345,182 | Corber | Mar. 28, 1944 |
| 2,446,393 | Russell | Aug. 3, 1948 |
| 2,540,009 | Pepper | Jan. 30, 1951 |
| 2,649,300 | Launder | Aug. 18, 1953 |